Figure 1:
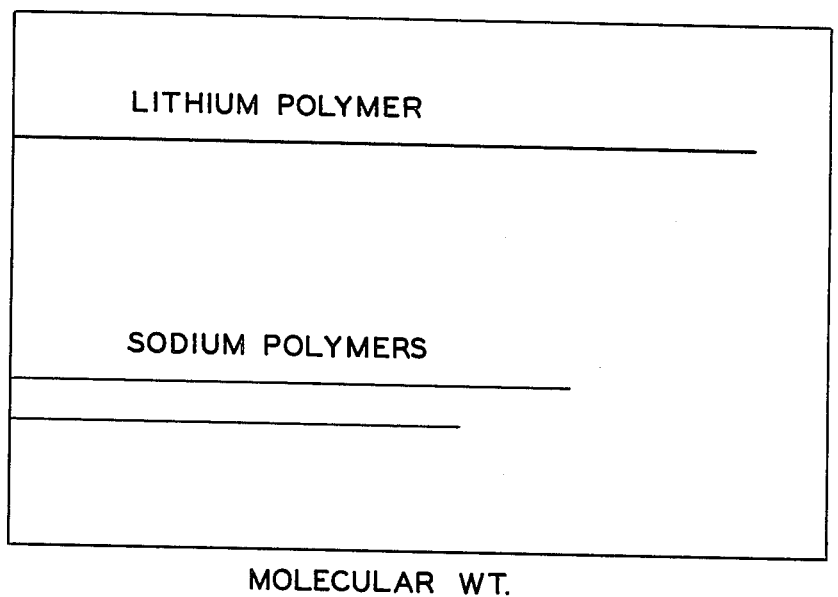

United States Patent [19]

Halasa

[11] 4,104,465
[45] Aug. 1, 1978

[54] HIGH-VINYL HOMOPOLYMERS AND COPOLYMERS OF BUTADIENE

[75] Inventor: Adel Farhan Halasa, Bath, Ohio

[73] Assignee: The Firestone Tire & Rubber Company, Akron, Ohio

[21] Appl. No.: 764,502

[22] Filed: Jan. 31, 1977

Related U.S. Application Data

[63] Continuation of Ser. No. 657,001, Feb. 11, 1976, abandoned.

[51] Int. Cl.² .............................................. C08F 4/46
[52] U.S. Cl. .................................... 526/174; 526/180
[58] Field of Search ................................ 526/174, 180

[56] References Cited

U.S. PATENT DOCUMENTS

| 3,451,988 | 6/1969 | Langer | 526/180 |
| 3,647,803 | 3/1972 | Schlott et al. | 526/180 |
| 3,931,127 | 1/1976 | Halasa et al. | 526/174 |
| 3,966,691 | 6/1976 | Halasa | 526/180 |

*Primary Examiner*—William F. Hamrock

[57] ABSTRACT

The invention relates to the production of high molecular weight polymers of broad molecular weight distribution by using a sodium catalyst in the presence of a chelating diamine in the polymerization of (1) conjugated dienes, (2) a mixture of conjugated dienes and (3) a mixture of conjugated diene and vinyl monomer. Lithium and potassium alkoxides speed up the reaction.

6 Claims, 2 Drawing Figures

MOLECULAR WT.

HIGH-VINYL HOMOPOLYMERS AND COPOLYMERS OF BUTADIENE

PRIOR ART

Langer U.S. Pat. No. 3,450,795 discloses the use of RLi or R$_2$Mg in which R is alkyl or aryl, with N,N,N',N'-tetramethyl-1,2-ethylene diamine (TMEDA) or other chelating bifunctional Lewis bases in the production of block copolymers of ethylene and an anionically polymerizable polar monomer.

Langer U.S. Pat. No. 3,451,988 discloses a catalyst prepared by mixing an organolithium such as n-butyl lithium with a chelating Lewis base which may be TMEDA. This is used in the homopolymerization or copolymerization of diolefins such as butadiene-1,3. Production of polybutadiene of high 1,2-content is disclosed. The patent makes no reference to sodium catalysts.

Langer U.S. Pat. No. 3,536,679 discloses polymerization of butadiene with and without styrene, and the production of polymers containing a high percentage of 1,2-vinyl configuration randomly distributed, with no tacticity, by using lithiated amine which may be lithiated TMEDA.

Bunting et al. U.S. Pat. No. 3,705,200 discloses the telomerization of butadiene with RNa (in which R is alkyl, cycloalkyl, aryl, aralkyl, alkaryl, alkenyl or cycloalkenyl) and a chelating diamine to produce relatively low molecular weight products. No rubbers are produced, nor is there any indication of the advantageous properties which are inherent is applicant's rubber products which have a molecular weight of 100,000 to 5,000,000.

Pappas et al. U.S. Pat. No. 3,189,660 describes the preparation of lubricating fluids (not rubbers) by telomerization with a sodium catalyst. No chelating diamine is used.

German Offenlegungsschrift of Kamiensky and Merkley, for U.S. Pat. No. 2,063,643 discloses the production of polybutadiene of 50.1 percent vinyl configuration by the polymerization of butadiene with a catalyst containing TMEDA and a complex derived from n-butyl lithium and potassium t-butyl alcoholate.

Schlott et al. U.S. Pat. No. 3,647,803 prepare a soluble complex of n-butyl sodium and TMEDA which has relatively short life. This complex is used in the polymerization of butadiene. The patent does not suggest the use of TMEDA to stabilize allylic sodium anion or the production of dianion of dienyl sodium at an intermediate step of the polymerization, as disclosed herein.

SUMMARY OF THE INVENTION

It has been found that (1) a conjugated diene containing 4 to 8 carbon atoms, (2) a mixture of such conjugated dienes or (3) a mixture of such a conjugated diene and a vinyl aromatic monomer, using an organosodium catalyst in a hydrocarbon solvent in the presence of chelating diamine such as TMEDA, for instance, when polymerized as disclosed herein, yields polymers of such high molecular weight as to be useful rubbers. The molecular weight may be 100,000 to 5,000,000. The polymers have a broad molecular weight distribution so that they are readily processed. The polymers are characterized by ease of molding and processability. They contain a higher degree of stereospecifity than usual, that is they contain at least 85 percent of 1,2-microstructure of which a high percentage is isotactic units.

Figure 2:
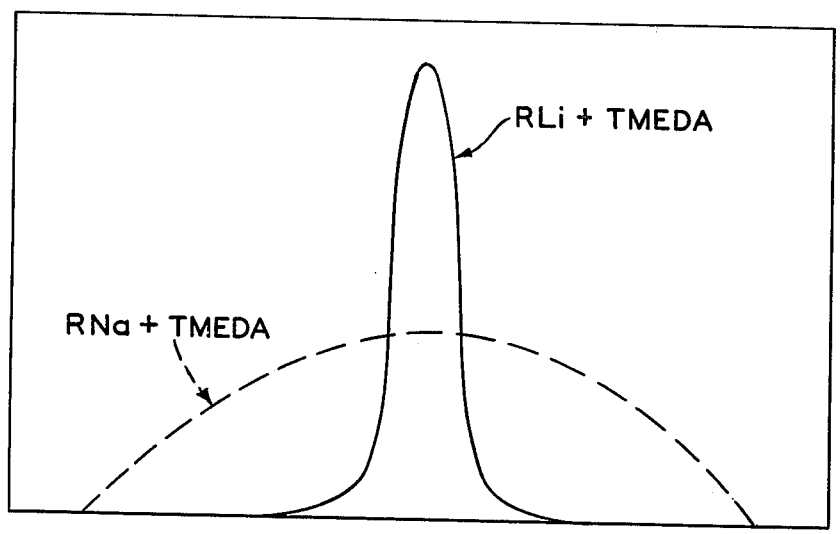

High molecular weight polybutadiene and styrene-butadiene copolymer have been known and have been made by organolithium initiators with polar modifiers. However, these polymers are of narrow molecular weight distribution and show poor processability. This lack of desired desired mechanical properties suggests that these polymers need to be coupled or their molecular weight modified to improve their processability. The polymers made by the process of this invention, however, are excellent for processability since their molecular weight is broad and highly branched as illustrated in FIG. 2.

A major difference in structure also exists between (1) the high vinyl polybutadiene polymers made with organolithium and modifier and (2) the organosodium-modified polymers of this invention. In the organolithium-modified polymers, the vinyl structure is heterotactic and there is random distribution whereas the organosodium-modified polymers show distinct conformation with high vinyl of substantially 80 percent isotactic and 20 percent syndiotactic analysis, the analyses being made by carbon 13 NMR.

Schlott et al. U.S. Pat. No. 3,647,803 discloses the use of chelating diamines to solubilize organosodium compounds in hydrocarbon solvents, producing a complex which they use in polymerization. Their process requires separation of products with low yield of soluble organosodium compounds. Since the organosodium attaches to the diamine the products have short life and must be used without delay. Applicant uses the chelating diamine to stabilize the allylic anion, producing dianion of dienyl sodium which initiates the polymerization. The allylic sodium is soluble in hydrocarbon solvents and the diamines help to maintain the live ends stable to produce the desired high molecular weight products.

Organosodium compounds are poor initiators for 1,3-butadiene polymerization at high temperatures, up to 100° C. Addition of chelating diamines improves their catalyst effects at temperatures between 0°–30° C. and give a high vinyl content of 55 to 65 percent and high molecular weight but are poor initiators at 50°–100° C. The addition of LiOR or KOR in which R is an alkyl group of 1 to 10 or more carbon atoms improves the initiation and gives high molecular-weight polymers up to 1,000,000 or more and a vinyl content of the butadiene units of 80 percent and higher.

The catalyst used in this process may be described as having the formula RNa in which R is a hydrocarbon alkyl group of 1 to 8 or more carbon atoms or R is a hydrocarbon aryl group such as benzyl, toluyl, naphthyl, etc. Representative compounds are methyl sodium, propyl sodium, n-butyl sodium, t-butyl sodium, the pentyl, hexyl, heptyl and octyl sodiums, phenyl sodium, tolyl sodium, ethyl benzene sodium, mesitylene sodium, cymene sodium, etc.

A chelating diamine is used in the presence of the organosodium catalyst.

The preferred chelating amines include:
N,N,N',N'-tetramethyl ethylene diamine
N,N,N',N'-tetramethyl methanediamine
N,N,N',N'-tetramethyl-1,2-ethanediamine
N,N,N',N'-tetramethyl-1,3-propanediamine
N,N,N',N'-tetramethyl-1,4-butanediamine
N,N,N',N'-tetramethyl-1,5-pentanediamine
N,N,N',N'-tetramethyl-1,8-octanediamine
N,N,N',N'-tetramethyl-1,10-decanediamine
N,N,N',N''',N'''-hexamethyltriethylene-tetramine N,N,N',N'',N''-pentamethyldiethylene-triamine
N,N,N',N'-tetramethyl-1,2-cyclopentanediamine
N,N,N',N'-tetramethyl-1,2-cyclohexanediamine (cis-, trans- and mixtures of cis- and trans-isomers)
N,N,N',N'-tetramethyl-1-cyclohexyl-1,2-ethanediamine
N,N,N',N'-tetramethyl-2,3-butane-diamine
N,N-dimethyl-N'-N'-diethyl-1,2-ethanediamine
N,N,N',N'-tetramethyl-1,2-eicosane-diamine The catalyst system may be activated by using potassium or lithium t-alkoxide, such as t-butoxide, t-pentoxide, t-hexoxide, etc. in which the alkane contains 3 to 20 or more carbon atoms. These alkoxides are useful for increasing the molecular weight. They are not necessary but can be used to give better control of the molecular weight and molecular weight distribution, the vinyl content and the rearrangement of the vinyl group in their special rearrangements. The polymerization is carried out in a usual polymerization solvent such as one of the hydrocarbon solvents. The organosodium compound can be used in a Na/monomer ratio of 0.1 to 2 gram atoms of sodium per 100 grams of monomer. The amount of chelating diamine used varies from 0.05 to 10 grams per 100 grams of monomer. The amount of alkoxide, if alkoxide is used, varies from 0.1 to 2.0 grams per 100 grams of monomer. The polymerization is usually completed in 2 to 6 hours time, but is continued until 100 percent conversion is obtained. The polymerization time is not critical.

Pappas et al. in U.S. Pat. No. 3,189,660 have shown that the organosodium initiator for butadiene telomerization yields oligers and telomers with a molecular weight of about 500. The reason for this is that in the reaction organosodium transfers from live polymer to butadiene monomer with destabilization of allylic sodium. That is the controlling factor in which allylic sodium transfers and yields telomer, and an allylic lithium always gives high molecular-weight polymers. This is illustrated in FIG. 1 of the accompanying drawing.

It has been found that allylic sodium can be stabilized to give high molecular-weight polymer with a molecular weight of 100,000 to 5,000,000 which is useful as a rubber if the allylic sodium is chelated with a chelating diamine such as TMEDA, as the polymerization proceeds in the presence of unreacted monomer and lithium or potassium alkoxide modifier.

The chelating diamines are quite different from any polar modifier in which the charge is spread over the two nitrogens as shown in the following equation in which Bd stands for butadiene:

EQUATION NO. 1

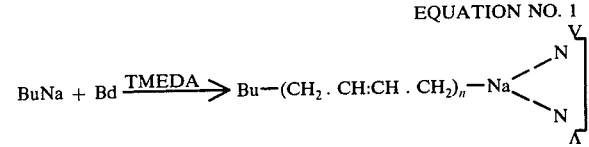

in the presence of polar modifiers such as ethers and monoamines, the organosodium compounds cleave the esters and metalate the amines, as illustrated below.

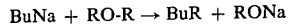 BuR + RONa     EQUATION NO. 2

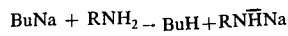 BuH + RN$\overline{\text{H}}$Na     EQUATION NO. 3

The critical feature of the reaction of this invention is the chelation in which metalation is suppressed due to stabilization of the organosodium as shown in EQUATION NO. 1. As the basicity of the sodium compounds is reduced, they are added to the 1,3-diolefins rather than metalating the amine as illustrated in EQUATION NO. 3. The reason that high molecular-weight polymer is formed is that the live sodium produced by the addition reaction, does not go into the elimination reaction as illustrated below, which leads to dead polymer chains of low-molecular-weight. The elimination reaction releases NaH which adds to butadiene to start a new chain as illustrated below in the Transfer Reaction.

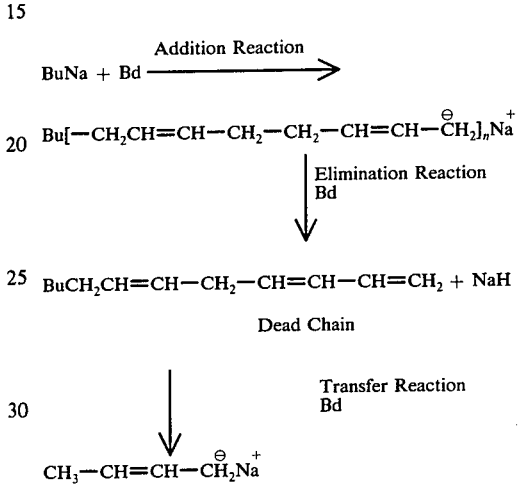

Schlott's reaction involves addition of the organosodium compound to the chelating diamine. The complex produced is similar to that shown in EQUATION NO. 3 where the sodium metal is attached to the diamine as Compound B, as follows:

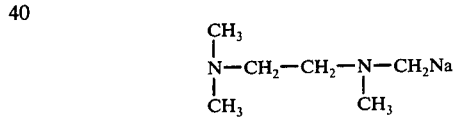

This structure is known to be unstable and decomposes to give N-sodio-dimethyl amine as shown below.

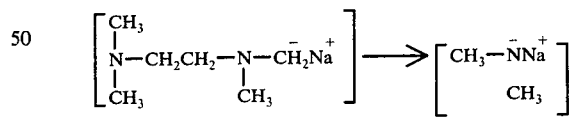

Butylsodium is insoluble but stays alive when mixed with TMEDA and yields Structure A.

EXAMPLE 1

In each of several 28-ounce beverage bottles which had been washed and baked at 140° C., was charged 250 gr. of a blend of 24 percent 1,3-butadiene in 76 percent hexane. The blend was purged with nitrogen and 1.5 mmoles of n-butylsodium was added to each bottle with varying amounts of TMEDA. The bottles were placed in a polymerization bath and after the reaction was carried to completion the bottes were taken off and worked up by coagulation in isopropyl alcohol containing DBPC (ditert-butyl cresol) as stabilizer.

Table I shows the effect of varying the TMEDA. The vinyl content increased from 62 percent (no TMEDA) to 85 percent in the presence of TMEDA. The DSV increased from 0.5 without TMEDA, but more significantly the polymerization increased from the usual 30 percent conversion without TMEDA to about 100 percent. All examples analyzed for zero gel.

TABLE I

POLYMERIZATION OF 1,3-BUTADIENE IN HEXANE USING 1.5 MMOLES Na PER 100 GRAMS OF BUTADIENE

| EXAMPLE: | 1 | 2 | 3 | 4 | 5 | 6 | 7 | 8 | 9 | 10 |
|---|---|---|---|---|---|---|---|---|---|---|
| Na/TMEDA | 1 | .1 | 0.025 | 1 | 2 | 4 | 8 | * | 10 | .3 |
| Temperature, °C. | 5 | 50 | 5 | 50 | 50 | 50 | 50 | 50 | 50 | 50 |
| Cis-1,4% | 9 | .1 | 7 | 7.7 | 8.2 | 8.8 | 9.3 | 20 | 13 | 9 |
| Trans-1,4% | 18 | 12 | 9 | 10.4 | 10.5 | 12.4 | 12.1 | 18.6 | 14 | 10 |
| 1,2-Polymer, % | 73 | 78 | 84 | 82 | 81 | 79 | 79 | 62 | 75 | 81 |
| DSV | 4.12 | .79 | 1.21 | 1.3 | 1.27 | 1.1 | 1.2 | .5 | .8 | .76 |
| TOTAL FOUND - % | — | 98 | 98 | 103 | 101 | 97 | 103 | 98 | 97 | 98 |

*No TMEDA

EXAMPLE 2

The procedure of Example 1 was repeated, except that lithium alkoxide was added as modifier. The striking difference is that the solution viscosity increased considerably from .5 DSV without TMEDA or alkoxide to 16.85 DSV with both TMEDA and alkoxide.

TABLE II

POLYMERIZATION OF 1,3-BUTADIENE IN HEXANE USING 1.5 MMOLES OF n-BUTYLSODIUM PER 100 GRAMS OF BUTADIENE AND LITHIUM y-BUTOXIDE AS INDICATED

| EXAMPLES: | 1 | 2 | 3 | 4 | 5 | 6 | 7* |
|---|---|---|---|---|---|---|---|
| Na/TMEDA | 2 | 1 | .5 | 1 | .5 | 1.6 | — |
| Na/Li | 1 | 1 | 1. | 1 | .5 | 1 | — |
| Li/TMEDA | 2 | 1 | .5 | 1 | 1 | 1.6 | — |
| Temperature, °C. | 5 | 5 | 5 | 50 | 50 | 50 | 5 |
| 1,2-Polymer, % | 81 | 81 | 86 | 65 | 73 | 84 | 81 |
| DSV | 5.34 | 13.76 | 16.85 | 3.12 | 4 | 2.76 | .5 |
| TOTAL FOUND** | | | | | | | |

*No TMEDA or Li was included.
**Total found for each example was 90 to 100 per cent.

No gel was formed in any of the reactions.

The addition of lithium alkoxide to the polymerization reaction manifests itself in the increase in molecular weight of the polymer, as shown by the increase in DSV from about 1 to 16.

Table III records the results obtained following the procedure of Table II but using potassium t-butoxide instead of lithium t-butoxide.

TABLE III

POLYMERIZATION OF 1,3-BUTADIENE IN HEXANE USING 1.5 MMOLES OF Na PER 100 GRAMS OF BUTADIENE

| EXAMPLES: | 1 | 2 | 3 | 4 | 5 | 6 |
|---|---|---|---|---|---|---|
| Na/K | 0.5 | 0.5 | 0.5 | 0.5 | 0.5 | 0.5 |
| Na/TMEDA | 0.5 | 1.5 | 4.0 | 0.05 | * | * |
| K/TMEDA | 3 | 3 | 3 | 3 | | |
| 1,2-Polymer, % | 54.6 | 49.9 | 49.3 | 55.7 | 56.6 | 52.8 |
| Temperature, % | 5 | 5 | 5 | 5 | 5 | 30 |
| DSV | 2.70 | 2.86 | 3.24 | 3.43 | 1.84 | 1.77 |
| Gel | 0 | 0 | 0 | 0 | | |
| TOTAL FOUND | | | | | | |

*No TMEDA

Tables I and II indicate that TMEDA increases the 1,2-content and the addition of lithium t-butoxide increases the molecular weight of the polymer.

Table III shows that the K-t-butoxide increases only the molecular weight; not the 1,2-content.

I claim:

1. The process of polymerizing monomer selected from the group consisting of (a) conjugated diene containing 4 to 8 carbon atoms, (b) a mixture of such conjugated dienes, and (c) a mixture of such conjugated diene and a vinyl aromatic compound, to produce a polymer having a molecular weight of 100,000 to 5,000,000, a dilute solution viscosity of 1 to 10, and a 1,2-vinyl group content of at least 80 percent, which process comprises polymerizing such conjugated diene with or without vinyl monomer by reacting 1 to 2 parts of sodium as hydrocarbon sodium with the monomer in the presence of 0.1 to 10 parts by weight of chelating diamine and 0.1 to 2.0 parts of lithium or potassium t-alkoxide per 100 parts of monomer, in which alkoxide the alkane group contains 3 to 20 carbon atoms.

2. The process of claim 1 in which butadiene is polymerized to produce polymer containing at least 85 percent 1,2-polybutadiene.

3. The process of claim 2 in which the chelating diamine is N,N,N',N'-tetramethylethylenediamine.

4. The process of claim 2 in which the sodium compound used in the catalyst system is n-butylsodium.

5. The process of claim 1 in which 0.1 to 2.0 parts of potassium alkoxide is present.

6. The process of claim 1 in which 0.1 to 2.0 parts of lithium t-alkoxide is present.

* * * * *

UNITED STATES PATENT OFFICE
CERTIFICATE OF CORRECTION

Patent No. 4,104,465　　　　　　　　　Dated August 1, 1978

Inventor(s) Adel Farhan Halasa

It is certified that error appears in the above-identified patent and that said Letters Patent are hereby corrected as shown below:

Column 2, line 6
　desired has been written twice

Column 3, line 65, Equation No. 3

"$R\overline{NH}Na$" should be -- $R\overline{NH}Na^+$ --

Column 5, Table I, item 3, under heading marked "2"
　" .1 " should be -- 1. --

Table II, in Column 2, third line of the title
　"y-Butoxide" should be -- t-Butoxide --

Signed and Sealed this

Sixth　Day of November 1979

[SEAL]

Attest:

RUTH C. MASON　　　　　　　　　LUTRELLE F. PARKER
Attesting Officer　　　　　　Acting Commissioner of Patents and Trademarks